United States Patent
Walters et al.

[11] 3,939,686
[45] Feb. 24, 1976

[54] WEDGE ACTUATED CUTTING AND/OR FORMING TOOLS

[75] Inventors: Andrew C. Walters, Dallas; William M. Goss, Richardson, both of Tex.

[73] Assignee: Fabco, Incorporated, Lewisville, Tex.

[22] Filed: July 15, 1974

[21] Appl. No.: 488,792

Related U.S. Application Data

[62] Division of Ser. No. 331,237, Feb. 9, 1973.

[52] U.S. Cl. ...................... 72/441; 72/452; 72/453; 83/529; 100/291
[51] Int. Cl.² .......................................... B21D 7/06
[58] Field of Search ............ 72/452, 441, 453, 455; 100/271, 270, 291, 269; 83/529, 530, 291, 639, 630, 627; 192/138, 142; 425/DIG. 18

[56] References Cited
UNITED STATES PATENTS

| 552,710 | 1/1896 | Jefferies | 83/588 |
|---|---|---|---|
| 1,051,381 | 1/1913 | Berry | 83/460 |
| 2,433,672 | 12/1947 | May | 83/630 |
| 3,121,364 | 2/1964 | Castle | 83/530 |
| 3,269,246 | 8/1966 | Hanggi | 83/588 |
| 3,623,389 | 11/1971 | Krynytzky | 83/639 |
| 3,668,919 | 6/1972 | Hongo | 72/453 |
| 3,678,792 | 7/1972 | Dvorak | 100/291 |
| 3,743,469 | 7/1973 | Gibbons | 100/271 |
| 3,844,157 | 10/1974 | Bachmann | 72/452 |

FOREIGN PATENTS OR APPLICATIONS

| 814,097 | 9/1951 | Germany | 100/291 |
|---|---|---|---|
| 780,165 | 7/1957 | United Kingdom | 100/291 |
| 410,907 | 3/1910 | France | 72/452 |
| 848,782 | 7/1939 | France | 100/291 |
| 1,403,554 | 5/1965 | France | 72/455 |

*Primary Examiner*—C. W. Lanham
*Assistant Examiner*—Gene P. Crosby
*Attorney, Agent, or Firm*—Richards, Harris and Medlock

[57] ABSTRACT

A wedge actuated cutting and/or forming tool comprises a frame including spaced guide portions. A fixed platen is mounted on the frame and a movable platen is mounted on the guide portions of the frame for reciprocation toward and away from the fixed platen. A wedge is supported for lateral reciprocation with respect to a backup and thereby effects reciprocation of the movable platen. The wedge is driven by a hydraulic cylinder and switch means are provided for regulating both the separation between the movable platen and the fixed platen at the closest point and the total stroke of the movable platen. The frame further includes a hydraulic reservoir which receives a substantial quantity of hydraulic fluid. By this means the structure of the reservoir and the hydraulic fluid therein tend to stabalize the tool and dampen vibrations caused by the operation thereof.

3 Claims, 7 Drawing Figures

WEDGE ACTUATED CUTTING AND/OR FORMING TOOLS

This is a division of application Ser. No. 331,237, filed Feb. 9, 1973.

BACKGROUND AND SUMMARY OF THE INVENTION

This invention relates to wedge-operated cutting and/or forming tools, and more particularly to an improved wedge-type drive system useful in various types of power presses.

By definition, power presses comprise apparatus for reciprocating a tool holder or platen in a work area. This motion is typically utilized to move a first tool mounted on the movable platen toward and away from a second tool mounted on a fixed platen. By this means various operations are carried out, including piercing, shearing, blanking, bending, forming, and related operations.

Various specific types of power presses have also become recognized in the art. Thus, a shear is a power press that is specifically designed to cut strip materials to length. To this end shears are almost universally adapted to move a pair of cutting blades passed one another and thereby effect cutting. Typically, structure is also provided for preventing separation of the cutting blades during the cutting operation.

As opposed to a shear, a press brake is a power press adapted to perform bending and related forming operations. The tools or dies used in press brakes typically do not pass one another, so that structure for preventing separation between the tools is not required. On the other hand, the extent of separation between the tools at the closest point should be variable if the press brake is to have general utility.

A punch press is a type of power press adapted to perform a broader range of operations than is a shear or a press brake. To this end, punch presses typically incorporate structure to provide very precise control over the positioning of tools or dies throughout the reciprocatory cycle, as well as structure for varying the relative positioning of the tools at the closest point. One very common use of punch presses is in performing blanking and forming operations. Punch presses are also often utilized to perform various combinations of piercing, shearing, blanking, and forming operations, which may be carried out either simultaneously or progressively.

Heretofore most power presses have comprised a motor adapted to rotate a flywheel continuously. The flywheel is selectively coupled to an eccentric by means of a dog clutch, and the eccentric is in turn connected to a movable platen by a connecting rod. The press is actuated by tripping the dog clutch, whereby the eccentric is coupled to the flywheel for rotation through a single revolution. By this means the eccentric and the connecting rod operate to reciprocate the movable platen toward and away from a fixed platen.

At the present time the foregoing design is almost universally utilized in the manufacture of power presses. However, notwithstanding widespread usage, a number of major problems have been recognized in the design. For example, although the distance between the movable and the fixed platen at the closest point can be varied by adjusting the effective length of the connecting rod, the overall stroke of the movable platen cannot be changed without changing the eccentric of the press. The cycle time of the press also cannot be varied without changing substantially the entire structure thereof.

Another disadvantage is that once the clutch is tripped, the press must complete an operating cycle before the movement of the movable platen can be terminated. This is highly undesirable, both from a safety standpoint and from the standpoint of the possibility of damage to a very expensive set of tools should a foreign object become positioned therebetween. Perhaps the most important disadvantage to the eccentric and connecting rod type of power press is that the apparatus is very expensive to purchase. This high initial cost has literally prevented the use of shears, press brakes, and other types of power presses in various diverse types of small businesses.

The present invention comprises a novel drive system for power presses which overcomes the foregoing and other disadvantages long associated with the prior art. In accordance with the broader aspects of the invention, a wedge is supported for reciprocation by a fluid powered cylinder. The wedge is provided with a camming surface which engages a cooperating camming surface to effect reciprocation of a movable platen. By this means the wedge is adapted for actuation by the cylinder to move the movable platen toward and away from a fixed platen.

The use of the present invention provides numerous advantages over the prior art. Thus, power presses incorporating the invention may be manufactured for sale at less than one-half the price of eccentric and connecting rod power presses of similar capacity. Structure may be provided for varying both the overall length of and the terminal points of the stroke of the fluid powered cylinder. By this means not only the separation between the movable platen and the fixed platen at the closest point, but also the length of the stroke of the movable platen may be easily adjusted. Finally, the stroke of the fluid powered cylinder may be terminated at any time, regardless of whether or not an operating cycle has been completed. This is highly advantageous both from an occupational safety standpoint and from the standpoint of the ability to prevent damage to tools or dies which are actuated by the press.

In accordance with more specific aspects of the invention, the press further comprises a frame including guide portions which support the movable platen for reciprocation. The fixed platen extends between the guide portion to define one end of the work area. A backup is also provided for cooperation with the wedge to effect reciprocation of the movable platen under the action of the fluid powered cylinder.

The fluid powered cylinder preferably comprises a hydraulic cylinder. In such a case the press incorporates a self-contained hydraulic system including a hydraulic reservoir comprising part of the frame of the press. By this means the reservoir and the hydraulic fluid therein tend to add strength and rigidity to the frame, and tend to absorb vibrations which otherwise might be encountered during the operation thereof.

The hydraulic system further includes a pump which is driven by an electric motor. A solenoid controlled valve is provided for regulating the effective stroke of the hydraulic cylinder. The solenoid controlled valve is in turn operated under the control of switch structure which is responsive to reciprocation of the wedge and/or the movable platen. By this means complete control over the separation between the fixed and movable platens at the closest point and over the overall stroke of the movable platen is provided. A relief valve is also provided for terminating flow of hydraulic fluid to the hydraulic cylinder in the event that the movable platen becomes stalled. By this means any possibility of damage to the tools or dies actuated by the press is completely eliminated.

DESCRIPTION OF THE DRAWINGS

A more complete understanding of the invention may be had by referring to the following Detailed Description when taken in conjunction with the accompanying Drawings, wherein.

DETAILED DESCRIPTION

Figure 1:
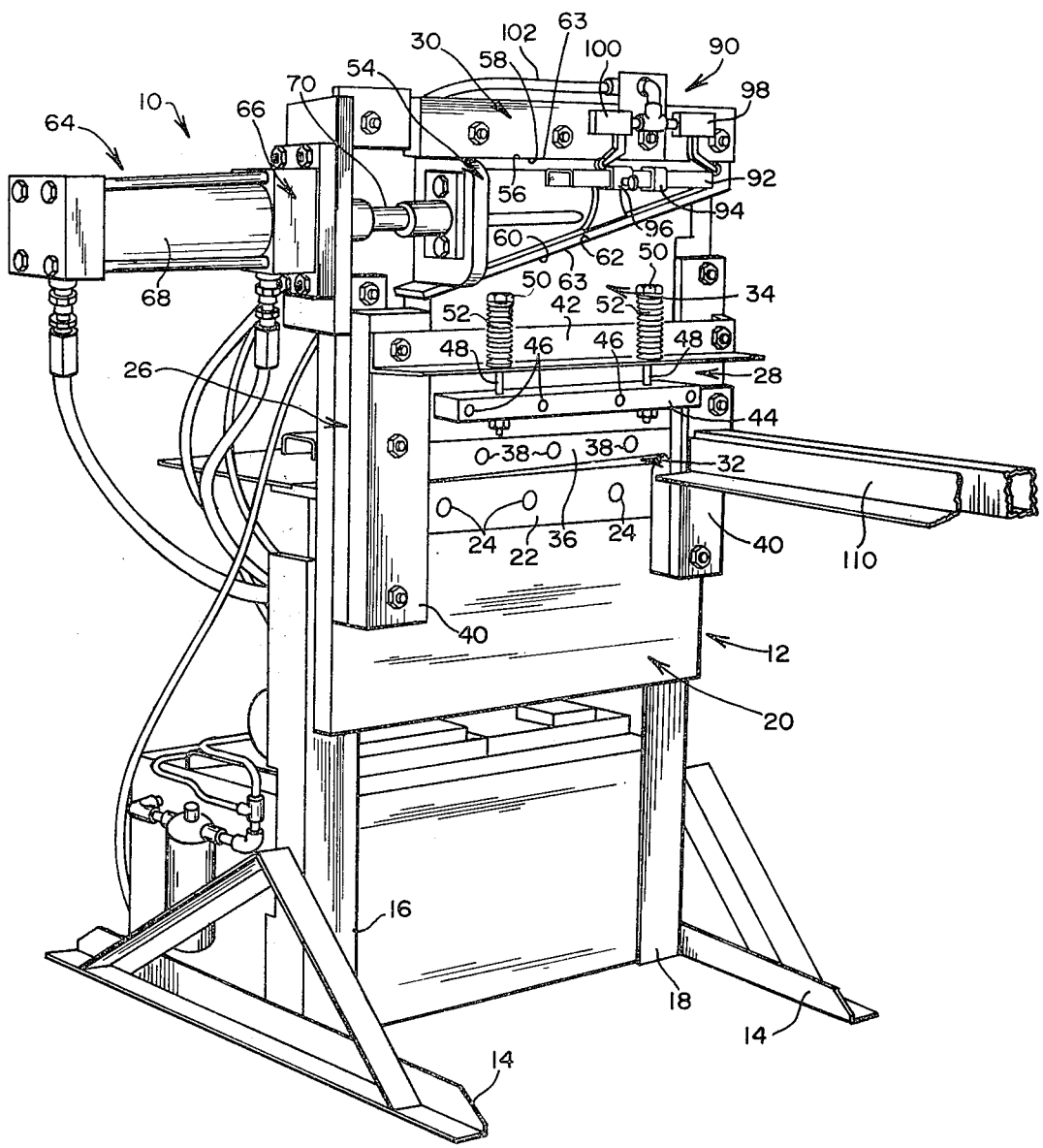
FIG. 1 is a rear perspective view of a shear incorporating the invention.
Figure 2:
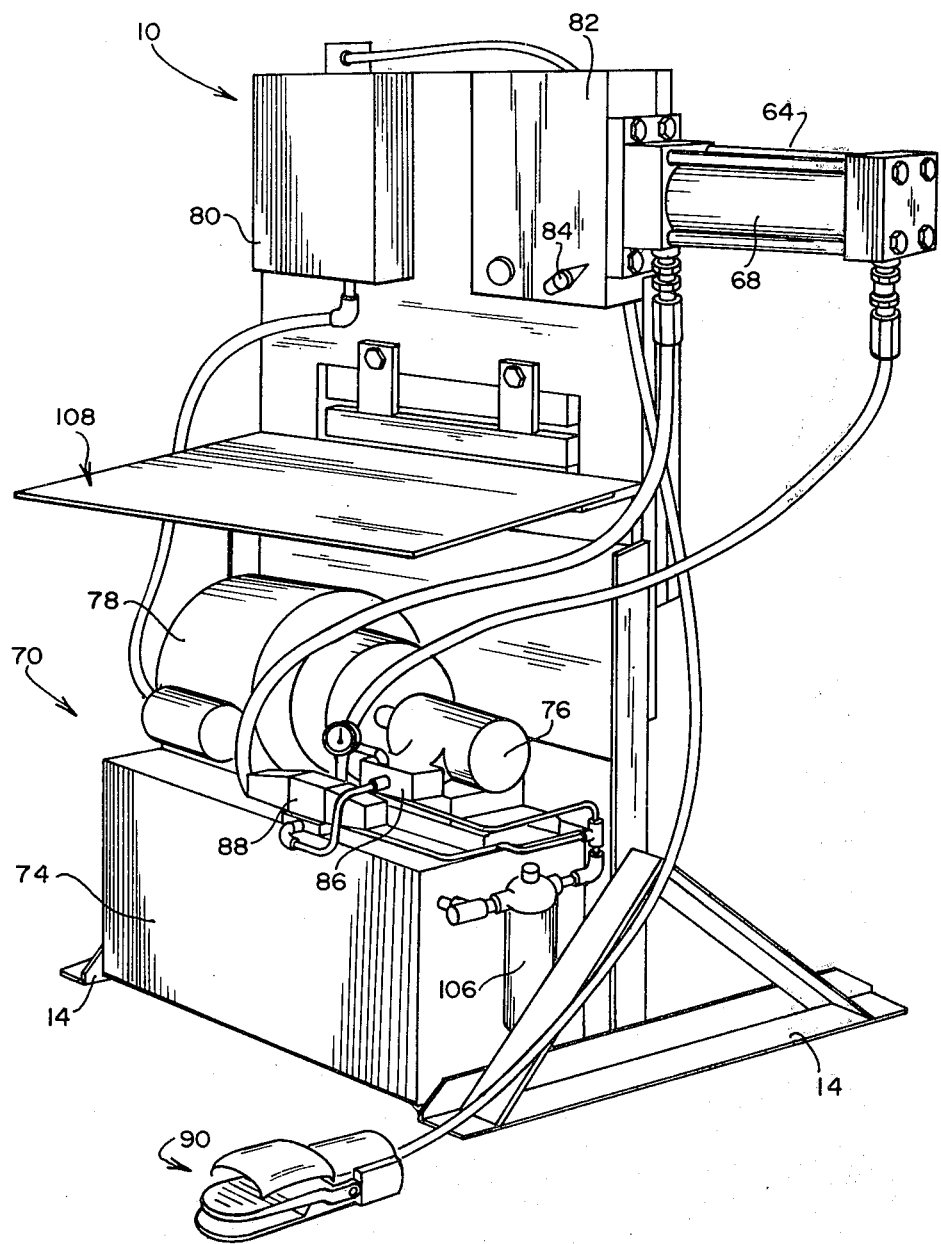
FIG. 2 is a front perspective view of the shear.

Referring now to the Drawings, and particularly to FIGS. 1 and 2 thereof, there is shown a shear 10 comprising the first embodiment of the invention. The shear 10 includes a frame 12 comprising a base 14 and a pair of risers 16 and 18 extending upwardly therefrom. A fixed platen 20 is secured to and extends between the risers 16 and 18. A lower cutting blade 22 is secured to the fixed platen 20 by means of a plurality of bolts 24. This permits removal of the blade 22 for sharpening and/or replacement.

The frame 12 of the shear 10 further includes a pair of guide portions 26 and 28 which extend upwardly from the fixed platen 20. A backup 30 is secured to and extends between the upper ends of the guide portions 26 and 28. There is thus defined a work area 32 which is enclosed by the fixed platen 20, the guide portions 26 and 28 and the backup 30 of the frame 12 of the shear 10.

A movable platen 34 is slidably supported on the guide portions 26 and 28 of the frame 12 for reciprocation in the work area 32 toward and away from the fixed platen 20. The movable platen 34 supports an upper cutting blade 36 which is secured to the platen 34 by means of a plurality of bolts 38. This permits the blade 36 to be removed from the platen 34 for sharpening and/or replacement.

Those skilled in the art will appreciate the fact that the function of the shear 10 is to cut metal and other tough materials. During such operations the blades 22 and 36 of the shear 10 tend to separate or spread in the direction extending mutually perpendicularly to the blades and the reciprocation thereof. To this end the guide portions 26 and 28 of the frame 12 are provided with reinforced portions 40. The function of the reinforced portions 40 is to prevent separation of the blades 22 and 36 and thereby insure a clean cut during each actuation of the shear 10.

A bar 42 is secured to and extends transversely between the reinforced portions 40 of the frame 12. A block 44 is secured to the movable platen 34 of the shear 10 by means of a plurality of bolts 46. Two or more bolts 48 are threadedly engaged with the block 44 and extend through apertures formed in the bar 42. The bolts 48 are provided with heads 50, and two or more compression springs 52 are mounted between the heads 50 of the bolts 48 and the bar 42. The springs 52 therefore tend to urge the movable platen 34 upwardly in the work area 32, whereby a gap is normally maintained between the blades 22 and 36 of the shear 10.

A wedge 54 is mounted between backup 30 and the movable platen 34 for lateral reciprocation to effect reciprocation of the movable platen toward and away from the fixed platen. The wedge 54 includes a surface 56 which is slidably engaged with a corresponding surface 58 on the backup 30. The wedge 54 further includes an angularly extending camming surface 60 which mates with a corresponding surface 62 on the movable platen 34. It will thus be understood that upon movement of the wedge 54 to the right (FIG. 1), the movable platen 34 is reciprocated downwardly against the action of the springs 52. Strips 63 comprising a non-metallic, low friction, pressure resistant material are positioned between the surfaces 56 and 58 and between the surfaces 60 and 62 to facilitate reciprocation of the wedge 54.

The wedge 54 is operated by a hydraulic cylinder 64. The hydraulic cylinder 64 includes a framework 66 which is mounted on the frame 12 and a barrel 68 which receives a piston (not shown). A piston rod 70 is connected between the piston of the hydraulic cylinder 64 and the wedge 54. Thus, upon reciprocation of the piston in the barrel 68, the wedge 54 is reciprocated with respect to the backup 30 and the movable platen 34.

Referring now to FIG. 2, the shear 10 further includes a self-contained hydraulic system 72 for operating the hydraulic cylinder 64. The hydraulic system 72 includes a hydraulic reservoir 74 which is mounted on and secured to the base 14 of the frame 12. The reservoir 74 includes a substantial quantity of hydraulic fluid, whereby the reservoir 74 and the hydraulic fluid therein add substantial strength and rigidity to the frame 12. Furthermore, the hydraulic fluid contained in the reservoir tends to dampen vibrations which might otherwise occur due to the operation of the shear 10.

The hydraulic system 72 further includes a hydraulic pump 76 which is driven by an electric motor 78. Electric current for operating the motor 78 is supplied through a junction box 80 and a motor control unit 82. The unit 82 includes an off-on switch 84 and other conventional control apparatus.

The hydraulic pump 76 functions to withdraw hydraulic fluid from the reservoir 74 and to supply pressurized hydraulic fluid to a relief valve 86 and a solenoid operated valve 88. The valve 88 functions under the control of a treadle switch 90 to control the flow of hydraulic fluid to the hydraulic cylinder 64. Thus, whenever the treadle switch 90 is tripped, the valve 88 directs hydraulic fluid to the blind end of the cylinder 64 and thereby actuates the cylinder to reciprocate the wedge 54 to the right (FIG. 1). Rightward movement of the wedge 54 in turn causes downward reciprocation of the movable platen 34 against the action of the springs 52. After the wedge 54 has been reciprocated rightwardly through a predetermined stroke, the valve 88 directs hydraulic fluid to the rod end of the hydraulic cylinder 64. By this means the cylinder 64 is actuated to reciprocate the wedge 54 to the left (FIG. 1). This in turn permits upward reciprocation of the movable platen 34 under the action of the springs 52.

Figure 3:
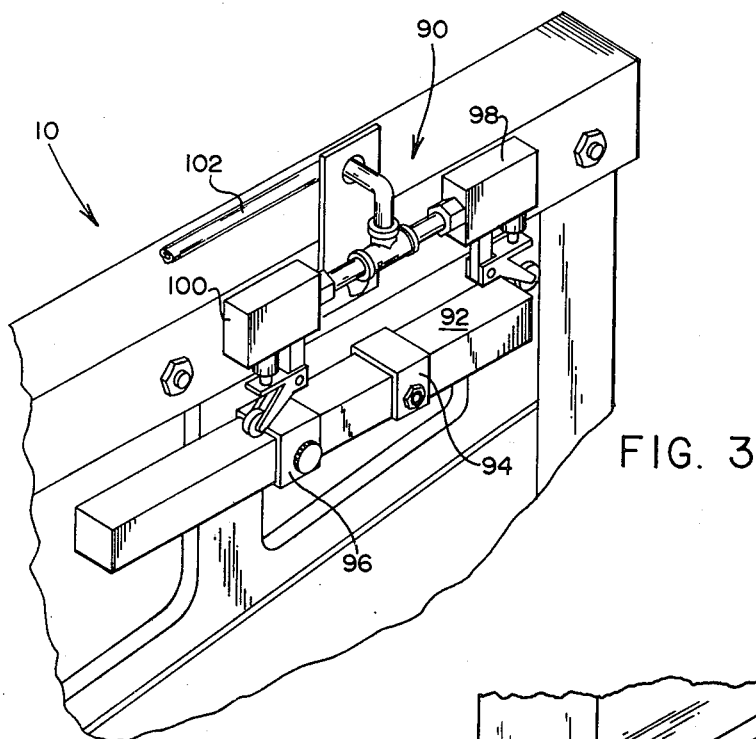
FIG. 3 is an illustration of the stroke control apparatus of the shear.

The stroke of the movable platen 34 of the shear 10 is regulated by a stroke control apparatus 92. As is best shown in FIGS. 1 and 3, the stroke control apparatus 92 includes a bar 94 which is supported on the wedge 54 for reciprocation therewith. The bar 94 in turn supports a pair of switch actuators 96 and 98. A pair of limit switches 100 and 102 are supported on the backup 30 for actuation by the switch actuators 96 and 98, respectively. The switches 100 and 102 are connected to the valve 88 of the hydraulic system 72 by electrical leads extending through a conduit 104.

Downward reciprocation of the movable platen 34 is regulated by the limit switch 100 and the switch actuator 96. Thus, whenever the switch actuator 96 engages the limit switch 100, the valve 88 is actuated to terminate rightward reciprocation of the wedge 54 and to initiate leftward reciprocation thereof. Conversely, upward reciprocation of the movable platen 34 is controlled by the limit switch 102 and the switch actuator 98. Thus, whenever the switch actuator 98 engages the limit switch 102, leftward reciprocation of the wedge 54 is terminated. Typically, rightward reciprocation of the wedge 54 is not immediately reinitiated upon termination of leftward reciprocation thereof. Instead, the treadle switch 90 must be reactuated in order to commence a new operating cycle of the shear 10. Continuous operation of the shear 10 may also be provided if required by a particular operation.

It will be appreciated that the movable platen 34 of the shear 10 has a maximum stroke which is determined by the length of the barrel 68 of the hydraulic cylinder 64. However, the stroke of the hydraulic cylinder 64 as determined by the stroke control apparatus 92 generally does not correspond with either end of the barrel 68. Instead, the hydraulic cylinder is reciprocated through a stroke which is substantially less than the maximum stroke and which is defined by limits intermediate the ends of the barrel 68. By this means both the upper and lower limits of the stroke of the movable platen 34 of the shear 10 are fully adjustable.

It will be further understood that due to the nature of a shear, the extent of downward reciprocation of the movable platen 34 is typically relatively fixed. Thus, it is merely necessary that the blades 36 and 22 pass one another in order to achieve a clean cut. On the other hand, the extent of upward reciprocation of the movable platen 34 depends on the thickness of the material to be cut. It is generally desirable to minimize the extent of upward reciprocation of the movable platen 34 in order to minimize the cycle time of the shear 10. However, in the event a longer cycle is desired for any reason, the extent of upward reciprocation may be increased by simply moving the switch actuator 98 to the left on the bar 94.

At this point an important advantage resulting from the use of the present invention may be noted. The wedge 54 is designed to provide a mechanical advantage of about 4:1. That is, the cutting force that is applied by the movable platen 34 is about four times the force that is applied to the wedge 54 by the hydraulic cylinder 64, and the length of the stroke of the movable platen 34 is about one quarter the length of the stroke of the wedge 54. This is advantageous because a smaller motor and pump and a smaller hydraulic cylinder may be utilized to produce a given cutting force between the blades 36 and 22. At the same time the longer stroke of the wedge 54 is utilized in the stroke control apparatus 92 to provide more accurate control over the stroke of the movable platen 34.

Referring again to FIG. 2, spent hydraulic fluid from the hydraulic cylinder 64 and from the relief valve 86 are returned to the hydraulic fluid reservoir through a filter 106. The function of the relief valve 86 is to terminate flow of hydraulic fluid to the hydraulic cylinder 64 in case the movable platen 34 should become jammed. For example, if a foreign object should be lodged between the blades 36 and 22 so that the stroke of the movable platen 34 could not be completed to the extent required by the stroke control apparatus 92, pressure would build in the blind end of the hydraulic cylinder 64. Then, at a predetermined pressure as determined by the setting of the relief valve 86, hydraulic fluid from the pump 76 is diverted to the reservoir 74 by the relief valve 86. This is highly advantageous both from a safety standpoint and in order to prevent damage to the blades 22 and 36 and to the remaining components of the shear 10.

The shear 10 is further provided with a guide table 108 whereby material to be cut is received between the blades 22 and 36. As is best shown in FIG. 1, an output guide 110 is also provided. Those skilled in the art will appreciate the fact that the guides 108 and 110 are conventional in nature and that other types of guides may be utilized in the practice of the invention, if desired.

Figure 4:
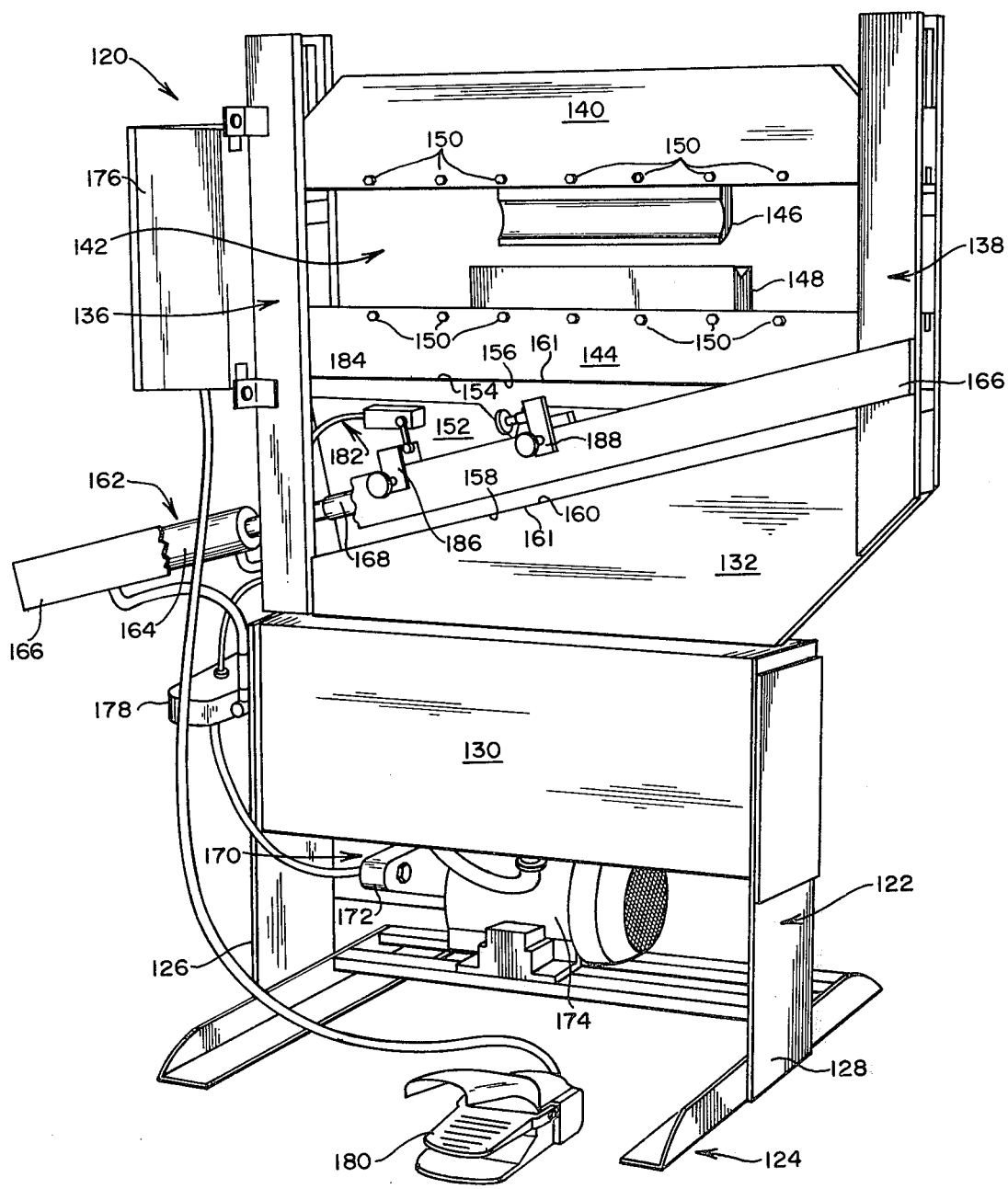
FIG. 4 is a perspective view of a press brake incorporating the invention.

Referring now to FIG. 4, there is shown a press brake 120 comprising a second embodiment of the invention. The press brake 120 includes a frame 122 having a base 124. A pair of risers 126 and 128 extend vertically upwardly from the base 124 of the frame 122. A hydraulic fluid reservoir 130 is secured to and extends between the upper ends of the risers 126 and 128.

A backup 132 is supported on the frame 122 above the hydraulic fluid reservoir 130. A pair of guide members 136 and 138 extend vertically upwardly from the backup 132. A fixed platen 140 is secured to and extends between the upper ends of the guide members 136 and 138. By this means there is defined a work area 142 which is surrounded by the backup 132, the guide members 136 and 138, and the fixed platen 140.

A movable platen 144 is slidably supported on the guide members 136 and 138 for reciprocation in the work area 142 toward and away from the fixed platen 140. The fixed platen 140 and the movable platen 144 support a pair of cooperating tools or dies 146 and 148, respectively. Upon reciprocation of the movable platen 144, the tools 146 and 148 are adapted to bend or form metal bars or sheets or other materials positioned therebetween. The tools 146 and 148 are supported on the platens 140 and 144 by a plurality of bolts 150 so as to be readily removable therefrom.

A wedge 152 is positioned between the backup 32 and the movable platen 144 for horizontal reciprocation with respect thereto. The wedge 152 includes a substantially horizontally disposed surface 154 which mates with a cooperating surface 156 on the movable platen 144. The wedge 152 further includes an angularly extending camming surface 158 which mates with a similar surface 160 on the backup 132. Thus, reciprocation of the wedge 152 to the right (FIG. 4) results in upward reciprocation of the movable platen 144, and reciprocation of the wedge 152 to the left (FIG. 4) permits downward reciprocation of the movable platen 144 under the action of gravity. Such reciprocation is facilitated by strips 161 positioned between the surfaces 154 and 156 and between the surfaces 158 and 160 and comprising a nonmetallic, low friction, pressure resistant material.

The wedge 152 of the press brake 120 is actuated by a hydraulic cylinder 162. The hydraulic cylinder 162 includes a barrel 164 having one end supported by a cross brace 166. The cross brace 166 is secured to and extends between the guide members 136 and 138 of the frame 122, and then leftwardly beyond the guide member 136 to support the hydraulic cylinder 162. The hydraulic cylinder 162 further includes a piston (not shown) adapted for reciprocation within the barrel 164. The piston is connected to the wedge 152 by a piston rod 168. It should be noted that the cross brace 166 and the hydraulic cylinder 162 extend substantially parallel to the camming surfaces 158 and 160 of the wedge 162 and the backup 132, respectively. Thus, although the wedge 152 moves upwardly as it is reciprocated by the hydraulic cylinder 162, the motion of the wedge 152 is substantially axial relative to the hydraulic cylinder.

The hydraulic cylinder 162 of the press brake 120 is actuated by a self-contained hydraulic system 170. The hydraulic system 170 includes the hydraulic fluid reservoir 130 which is normally filled with a substantial quantity of hydraulic fluid. By this means the structure of the reservoir 130 and the hydraulic fluid contained therein lend strength and rigidity to the frame 122 of the press brake 120. Also, the hydraulic fluid in the reservoir 130 tends to dampen vibrations which might otherwise occur during the operation of the press brake 120.

The hydraulic system 170 further includes a pump 172 which is driven by an electric motor 174. Power for driving the motor 174 is supplied through a motor control apparatus 176 including an off-on switch and other conventional control apparatus.

Figure 5:
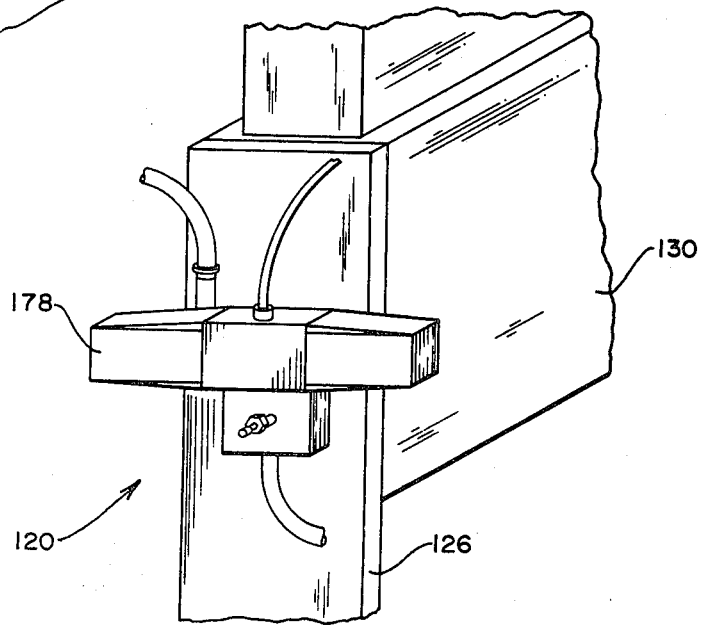
FIG. 5 is an illustration of the valve structure of the press brake.

As is best shown in FIG. 5, the pump 172 of the hydraulic system 170 functions to withdraw hydraulic fluid from the reservoir 130 and to supply pressurized hydraulic fluid to a relief valve 178 and to a solenoid controlled valve 180. The valve 180 functions to control the flow of hydraulic fluid to the hydraulic cylinder 162, and thereby controls the reciprocation of the wedge 152 and the movable platen 144. Thus, upon actuation of a treadle switch 182, the valve 178 actuates the cylinder 162 to reciprocate the wedge 152 to the right (FIG. 4). This results in upward reciprocation of the movable platen 144. After the wedge 152 has been reciprocated rightwardly to a predetermined extent, the valve 178 actuates the hydraulic cylinder 162 to reciprocate the wedge 152 to the left (FIG. 4). This results in downward reciprocation of the movable platen 144 under the action of gravity.

The reciprocation of the wedge 152 is further regulated by a stroke control apparatus 184. The apparatus 184 includes a limit switch 186 mounted on the wedge 152 for reciprocation therewith. A pair of switch actuators 188 and 190 are supported on the cross brace 166 of the frame 122. Thus, upon actuation of the treadle switch 182, the wedge 152 is reciprocated to the right (FIG. 4) until the limit switch 186 engages the switch actuator 190. The direction of reciprocation of the wedge 152 is thereupon immediately reversed, and the wedge 152 is reciprocated to the left (FIG. 4) until the limit switch 186 engages the switch actuator 188. At this point reciprocation of the wedge 152 is typically terminated pending subsequent actuation of the treadle switch 182. It will be appreciated, however, that continuous back and forth reciprocation of the wedge 152 may be provided, if desired.

It will be appreciated that in the case of a press brake, the separation between the fixed platen and the movable platen at the closest point must be adjusted in accordance with particular requirements. The length of the stroke of the movable platen is also preferably adjustable so as to accommodate stock of various sizes and to regulate the cycle time of the press brake. To this end the positioning of both of the switch actuators 188 and 190 on the cross brace 166 is rendered readily adjustable whereby the adjustment of the press brake 120 to provide particular stroke parameters as may be required by a particular job is provided. As was the case with the shear 10, the limits of the reciprocations of the wedge 152 and the movable platen 144 as determined by the switch actuators 188 and 190 typically do not correspond to the limits of the stroke of the hydraulic cylinder 152 as determined by the physical dimensions of the barrel 164.

As is best shown in FIG. 5, the relief valve 178 and the valve 180 return spent hydraulic fluid directly to the reservoir 130 through ports extending through the risers 126. The function of the relief valve 178 is to prevent damage to the hydraulic system 170 in the event of an overload condition. For example, if a foreign object should be positioned between the tools 146 and 148 so that the wedge 152 could not complete a full stroke as determined by the stroke control apparatus 184, pressure would build in the hydraulic system 170. However, as soon as the setting of the relief valve 178 is reached, further hydraulic fluid from the pump 172 is returned directly to the reservoir 130. By this means damage to the tools 146 and 148 due to excessive force imposed thereon is prevented.

The press brake 120 further includes a pair of guides 192 and 194 mounted on opposite sides of the movable platen 144. The purpose of the guides 192 and 194 to properly position the stock between the tools 146 and 148 prior to actuation of the hydraulic cylinder 162 to effect reciprocation of the wedge 152 and the movable platen 144. An interesting aspect of the press brake 120 is that since the guides 192 and 194 are mounted on the movable platen 144, the guides are reciprocated with the movable platen. Those skilled in the art will appreciate the fact that the guides 192 and 194 are substantially conventional in nature and that other guide arrangements may be utilized in the practice of the invention, if desired.

Figure 6:
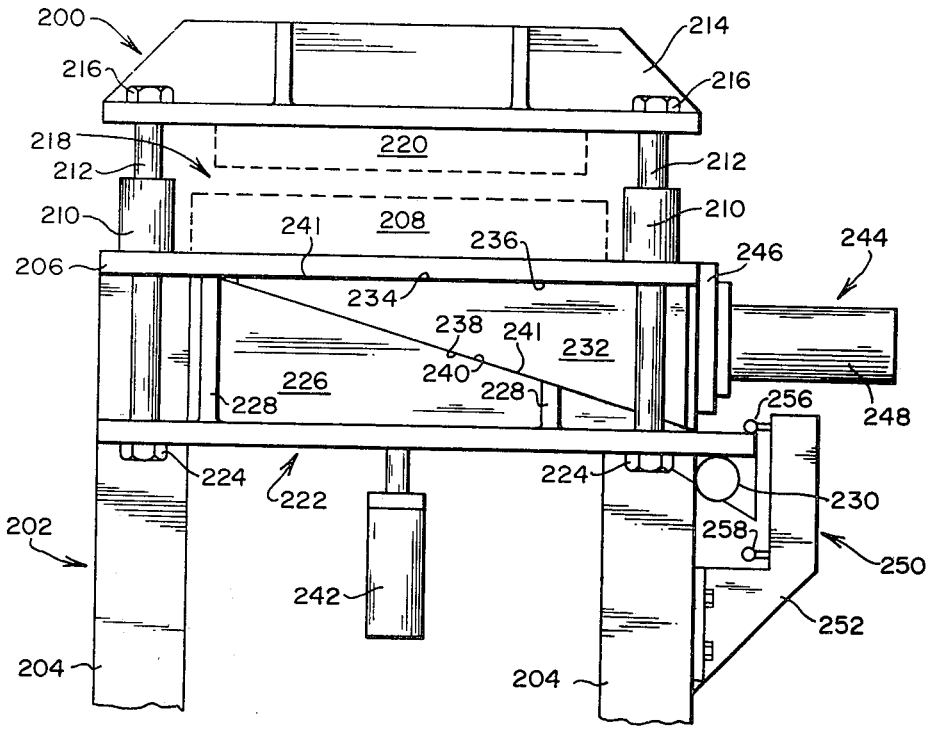
FIG. 6 is a front view of a punch press incorporating the invention.
Figure 7:
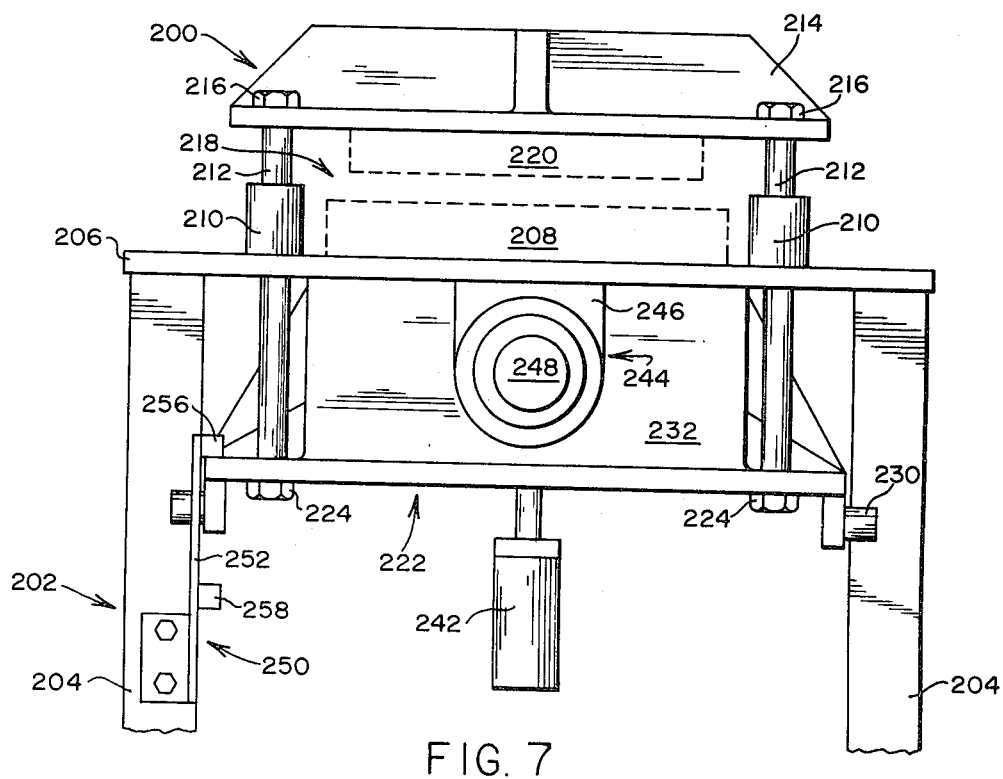
FIG. 7 is a side view of the punch press.

Referring now to FIGS. 6 and 7, there is shown a punch press 200 comprising a third embodiment of the invention. The punch press 200 includes a frame 202 comprising a base (not shown) and four legs 204 extending upwardly therefrom. A fixed platen 206 is secured to and extends between the upper ends of the legs 204. A lower die 208 is supported on the fixed platen 206 of the punch press 200.

The frame 202 further includes four guide members 210 which extend upwardly from the fixed platen 206. A cylinder 212 is slidably received at each guide member 210, and a movable platen 214 is secured to the upper ends of the cylinders 212 by a plurality of fasteners 216. There is thus defined a work area 218 which is enclosed by the fixed platen 206, the guide members 210, the cylinders 212, and the movable platen 214.

A movable die 220 is mounted on the movable platen 214 for reciprocation in the work area 218 toward and away from the fixed die 208. As will be appreciated by those skilled in the art, the dies 208 and 220 of the punch press 200 may be designed to perform piercing, blanking, forming, and related functions, or any combination of these functions. The dies 208 and 220 may also comprise progressive dies of the type commonly utilized in punch presses.

A backup 222 is secured to the lower ends of the cylinders 212 by a plurality of fasteners 224. A backup 222 includes a central portion 226 which is reinforced by a plurality of triangularly shaped members 228. A plurality of guide rollers 230 are mounted on the underside of the backup 222 for engagement with the legs 204 of the frame 202.

A wedge 232 is mounted between the backup 222 and the fixed platen 206 for horizontal reciprocation to effect vertical reciprocation of the movable platen 214. The wedge 232 includes a horizontally extending surface 234 which is slidably engaged with a corresponding surface 236 of the fixed platen 206. The wedge further includes an angularly extending camming surface 238 which mates with a corresponding surface 240 on the central portion 226 of the backup 222. Strips 241 comprising a nonmetallic, low friction, pressure resistant material are positioned between the surfaces 234 and 236 and between the surfaces 238 and 240.

It will thus be understood that upon reciprocation of the wedge 232 to the left (FIG. 6) the backup 222 is reciprocated downwardly. Since the backup 222 is connected to the movable platen 214 by the cylinders 212, this action also results in downward reciprocation of the movable platen 214. Upon subsequent reciprocation of the wedge 232 to the right (FIG. 6) the backup 222 is reciprocated upwardly by a small cylinder or spring 242. Again, since the cylinders 212 connect the backup 222 in the movable platen 214, this action results in a corresponding upward reciprocation of the movable platen.

The wedge 232 is operated by a hydraulic cylinder 244. The hydraulic cylinder 244 is supported on the fixed platen 206 by a framework 246, and includes a barrel 248 which receives a piston (not shown). A piston rod (also not shown) connects the piston of the hydraulic cylinder 244 to the wedge 232. Thus, upon reciprocation of the piston in the barrel 248, the wedge 232 is reciprocated horizontally to effect vertical reciprocation of the movable platen 214.

The punch press 200 further includes a self-contained hydraulic system which is substantially identical to the hydraulic systems 72 and 170 of the shear 10 and the press brake 120, respectively. An important feature of the self-contained hydraulic system comprises a hydraulic fluid reservoir comprising part of the frame 202. The reservoir receives a substantial quantity of hydraulic fluid, whereby the structure of the reservoir and the hydraulic fluid therein add strength and rigidity to the frame 202. Furthermore, the hydraulic fluid contained in the reservoir tends to dampen any vibrations which otherwise might occur due to the operation of the punch press 200.

The self-contained hydraulic system of the punch press 200 functions to withdraw hydraulic fluid from the reservoir and to selectively direct pressurized hydraulic fluid to the hydraulic cylinder 244. Suitable valve structure is provided for controlling the flow of pressurized hydraulic fluid to the hydraulic cylinder 244 and for returning spent hydraulic fluid to the hydraulic fluid reservoir. Relief valve structure is also provided for terminating the advance of the movable platen 214 in the event that the pressure in the self-contained hydraulic system exceeds a predetermined level.

The stroke of the movable platen 214 of the punch press is regulated by a stroke control apparatus 250. The stroke control apparatus 250 includes a bracket 252 which is supported on one of the legs 204 of the frame 202. The bracket 252 in turn supports a pair of limit switches 256 and 258. The switches 256 and 258 are positioned for actuation by the backup 222 upon reciprocation thereof under the action of the wedge 232. The switches function to control the upper and lower limits of the stroke of the movable platen 214. By this means both the relative positioning of the movable and fixed platens at the closest point and the total stroke of the movable platen 214 are regulated.

Those skilled in the art will appreciate the fact that cutting and/or forming tools incorporating the present invention are adapted for working various metals including plain carbon steel, stainless steel, aluminum, brass, etc. Various plastics, paper and paperboard products, and similar materials may also be worked with tools utilizing the invention, if desired. It will be further understood that the cutting blades, dies, and other tools that are utilized in the practice of the invention are conventional in nature, and may be identical to the corresponding tools that have heretofore been utilized in power presses incorporating conventional designs.

The use of the invention is highly advantageous from a number of standpoints. Perhaps most importantly, cutting and/or forming tools utilizing the invention may be manufactured at approximately one-half the cost of conventional eccentric and connecting rod presses of similar capacity. This permits the use of tools incorporating the present invention in many applications wherein the use of power presses has heretofore been prohibited due to cost considerations.

Another important advantage to the use of the invention involves the fact that control is provided, not only over the separation between the movable and fixed platens at the closest point, but also over the total stroke of the movable platen. This affords greater flexibility in the use of tools incorporating the invention, and also substantially shortens the cycle time of the movable platen in appropriate applications.

Still another advantage to the use of the invention involves the ability to terminate the cycle of the movable platen at any time. This is important not only to prevent damage to the cutting blades, dies and other tools that are utilized in conjunction with the invention, but also from a safety standpoint.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:
1. A press brake comprising:
   a generally vertically extending frame including a pair of vertically extending guide portions and a hydraulic fluid reservoir containing a substantial quantity of hydraulic fluid, whereby the hydraulic fluid reservoir and the hydraulic fluid therein tend to stabilize the press brake and tend to absorb vibrations caused by the operation thereof;

a fixed platen extending between the upper ends of the guide portions of the frame and supporting a first forming tool;

a movable platen slidably supported on the guide portions of the frame beneath the fixed platen and supporting a second forming tool;

a backup extending between the lower ends of the guide portions of the frame;

a wedge mounted between the backup and the movable platen for lateral reciprocation with respect thereto;

said wedge and backup including cooperating camming surfaces whereby the movable platen is reciprocated toward and away from the fixed platen in response to lateral reciprocation of the wedge;

said hydraulic fluid reservoir being positioned beneath the fixed platen, the movable platen, the backup and the wedge;

a hydraulic cylinder mounted on the frame and operatively connected to the wedge and having a predetermined maximum stroke;

switch means including portions mounted on the wedge for reciprocation therewith to effect reciprocation of the hydraulic cylinder through a stroke shorter than the predetermined maximum;

hydraulic pump means mounted on the frame for withdrawing hydraulic fluid from the hydraulic fluid reservoir and supplying pressurized hydraulic fluid; and valve means for controlling the flow of pressurized hydraulic fluid from the hydraulic fluid pump means to the hydraulic cylinder and thereby selectively reciprocating the wedge and the movable platen.

2. The press brake according to claim 1 wherein the pump means comprises a motor supported on the frame and a hydraulic pump driven by the motor.

3. The press brake according to claim 1 wherein the wedge is adapted to provide a mechanical advantage of about 4:1.

* * * * *